US007769524B2

(12) United States Patent
Kalweit et al.

(10) Patent No.: US 7,769,524 B2
(45) Date of Patent: Aug. 3, 2010

(54) CONTROL SYSTEM FOR DETERMINING MASS AIR FLOW

(75) Inventors: Nicholas John Kalweit, Novi, MI (US); Layne K. Wiggins, Plymouth, MI (US); Qi Ma, Farmington Hills, MI (US)

(73) Assignee: GM Global Technology Operations, Inc.

( * ) Notice: Subject to any disclaimer, the term of this patent is extended or adjusted under 35 U.S.C. 154(b) by 283 days.

(21) Appl. No.: 12/107,854

(22) Filed: Apr. 23, 2008

(65) Prior Publication Data

US 2009/0012693 A1 Jan. 8, 2009

Related U.S. Application Data

(60) Provisional application No. 60/958,065, filed on Jul. 2, 2007.

(51) Int. Cl.
*G06F 19/00* (2006.01)
*G01L 7/00* (2006.01)

(52) U.S. Cl. .......................... 701/103; 701/115; 702/50

(58) Field of Classification Search ......... 701/101–103, 701/110, 115; 702/50, 52, 53, 108, 113, 702/127; 73/114.11, 114.16, 114.18; 123/478, 123/480, 486, 488, 491–494; 96/422
See application file for complete search history.

(56) References Cited

U.S. PATENT DOCUMENTS 4,096,831 A * 6/1978 Gunda ........................ 123/488
5,585,748 A * 12/1996 Yamaguchi et al. ......... 327/101
5,629,481 A * 5/1997 Sultan ..................... 73/204.18
6,955,080 B1 10/2005 Verdejo
6,999,882 B2 * 2/2006 Frie et al. ..................... 702/50
2006/0042469 A1 * 3/2006 Richards ...................... 96/422

FOREIGN PATENT DOCUMENTS

GB 2029027 A * 3/1980

* cited by examiner

*Primary Examiner*—Willis R Wolfe, Jr.

(57) ABSTRACT

A system and method comprises receiving a mass air flow signal having a frequency that varies based on mass air flow in an intake manifold of an engine, determining first period data from the mass air flow signal, deriving first mass data for the mass air flow signal based on the first period data, cumulating the first period data and the first mass data for N cylinder events, wherein N is an integer greater than 1, and calculating a mass air flow between the N cylinder events from the cumulated first period data and the cumulated first mass data.

20 Claims, 10 Drawing Sheets

94

96

CONTROL SYSTEM FOR DETERMINING MASS AIR FLOW

CROSS-REFERENCE TO RELATED APPLICATIONS

This application claims the benefit of U.S. Provisional Application No. 60/958,065, filed on Jul. 2, 2007, which is hereby incorporated by reference in its entirety.

FIELD OF THE INVENTION

The present invention relates to vehicle control systems, and more particularly to methods and systems for determining mass air flow in vehicles.

BACKGROUND OF THE INVENTION

The statements in this section merely provide background information related to the present disclosure and may not constitute prior art.

Sensors gather information from components of an engine system. The information is received by a control module that controls the engine system based on the received information. For example, a mass air flow (MAF) sensor may measure mass air flow. The MAF sensor may have a square wave output. The frequency of the MAF sensor output may vary relative to the mass air flow to the MAF sensor. The relationship between the frequency of the MAF sensor output signal and mass air flow may be known such that the mass air flow at a particular frequency may be found using a mass air flow vs. frequency look-up table.

The control module uses the measured mass air flow to control fuel injection. It may be useful to know the mass air flow that enters a cylinder between particular cylinder events. A cylinder event may be a cylinder air intake event, and may also be referred to as a low resolution (LORES) event. Some systems determine mass air flow using the average frequency between the engine events. This average frequency is used as an index for the mass air flow vs. frequency look-up table. However, averaging techniques may not account for nonlinearity in the relationship between mass air flow and frequency, and thus may result in an inaccurate average mass air flow.

Another way to determine mass air flow between cylinder events involves converting the frequency axis of the mass air flow versus frequency look-up table to a period axis. This conversion may be based on the relationship between frequency (cycles per second) and period (seconds per cycle). Mass air flow may also be converted to mass based on the relationship between mass air flow (mass per second), mass, and period. A timing module may receive the MAF output signal and measure the period of each cycle of the signal. The mass vs. period look-up table may be used by the timing module to determine a mass based on the period. The mass and period may then be accumulated between cylinder events.

The MAF sensor signal may not be synchronized with the cylinder events, such that an error may be associated with an uncounted partial MAF signal cycle between cylinder events. The magnitude of the error may be based on the period of the partial signal compared to the overall time between cylinder events. Vehicle operating conditions may occur where the output of the MAF sensor is at a low frequency (i.e., low mass air flow) and the cylinder events occur frequently (i.e., high RPM). A relatively small number of MAF sensor output signal cycles such as 5 may occur per cylinder event, such that a partial signal may create a potentially large error.

Referring to FIG. 1, a timing diagram illustrating a possible error due to cylinder event and MAF sensor output timing is demonstrated and generally identified at 10. In FIG. 1 there are five complete MAF sensor output pulses per cylinder event when the falling edges of the MAF sensor output line up with the cylinder (LORES) events. However, assuming that mass air flow calculations may be based on falling edges of the MAF sensor 34 output, five pulses occur between the first and second cylinder events and four pulses occur between the second and third cylinder events. This may cause different mass air flow readings for the same overall mass air flow.

Referring now to FIG. 2, a graph 12 illustrates sampling error in an exemplary 8 cylinder engine with varying engine RPM values and varying MAF sensor frequency values. Accuracy of 95 percent or greater may be considered acceptable. The accuracy is based on the percentage of time that a calculation may not yield an error in engine operation. The FIG. 2 shows accuracy falling below the acceptable range at high engine RPM levels and/or low MAF sensor output frequency levels. For example, at a MAF sensor frequency of 1000 and an engine RPM of approximately 3300, the accuracy is approximately 75%.

Referring now to FIG. 3, a graph 14 illustrates sampling error in an exemplary 4 cylinder engine with varying engine RPM values and varying MAF sensor frequency values. Accuracy of 95 percent or greater may be considered acceptable. The graph 14 shows that the accuracy falls below the acceptable range at high engine RPM levels and/or low MAF sensor output frequency levels. For example, at a MAF sensor frequency of 1000 and an engine RPM of approximately 6500, the accuracy is approximately 77%.

SUMMARY OF THE INVENTION

A method comprises receiving a mass air flow signal having a frequency that varies based on mass air flow in an intake manifold of an engine, determining first period data from the mass air flow signal, deriving first mass data for the mass air flow signal based on the first period data, cumulating the first period data and the first mass data for N cylinder events, wherein N is an integer greater than 1, and calculating a mass air flow between the N cylinder events from the cumulated first period data and the cumulated first mass data.

A control system comprises a timing module that receives a mass air flow signal having a frequency that varies based on a mass air flow in an intake manifold to an engine, that determines first period data from the mass air flow signal, that derives first mass data based on the first period data, and that cumulates the first mass data and the first period data, and a mass air flow module that calculates a mass air flow for N cylinder events from the cumulated first mass data and the cumulated first period data, wherein N is an integer greater than 1.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION

Figure 1:
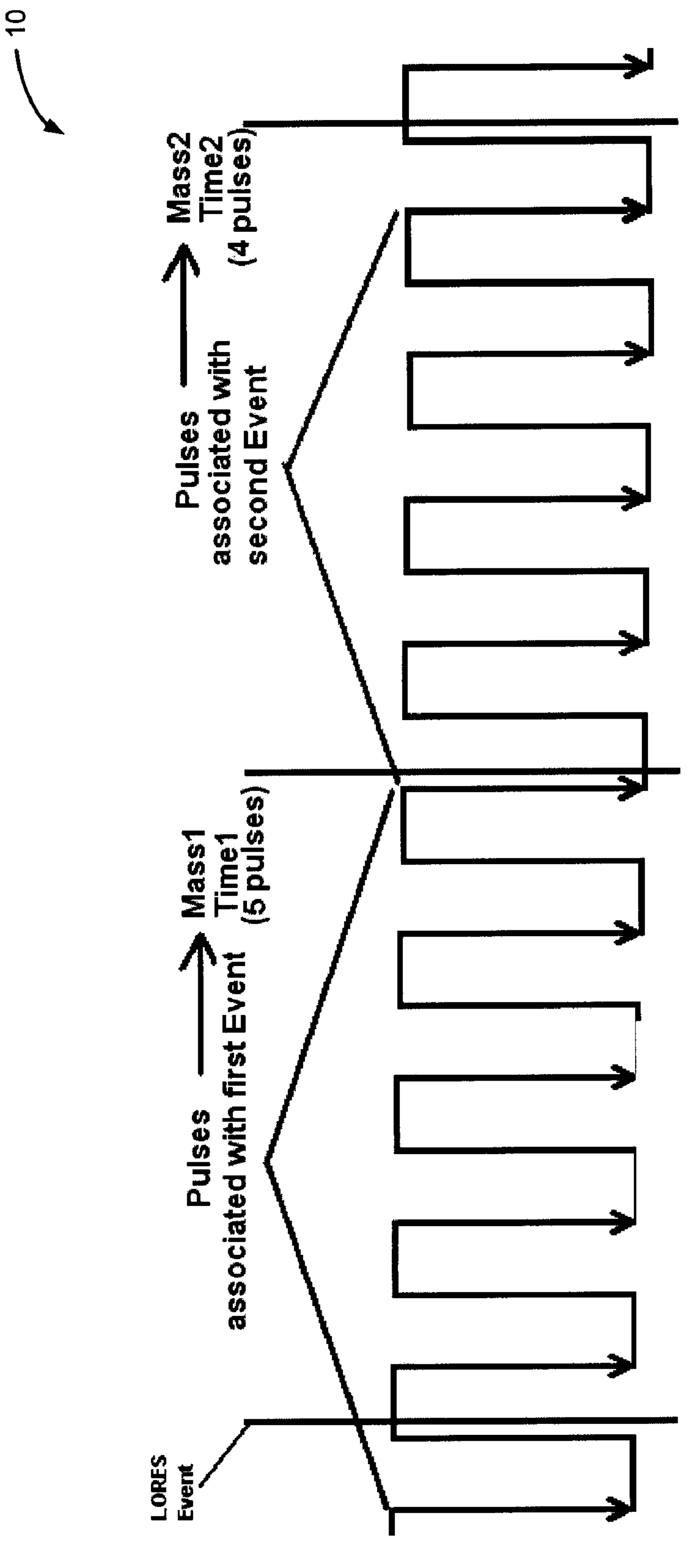
FIG. 1 is a graph illustrating a sampling error in mass air flow measurement.
Figure 2:
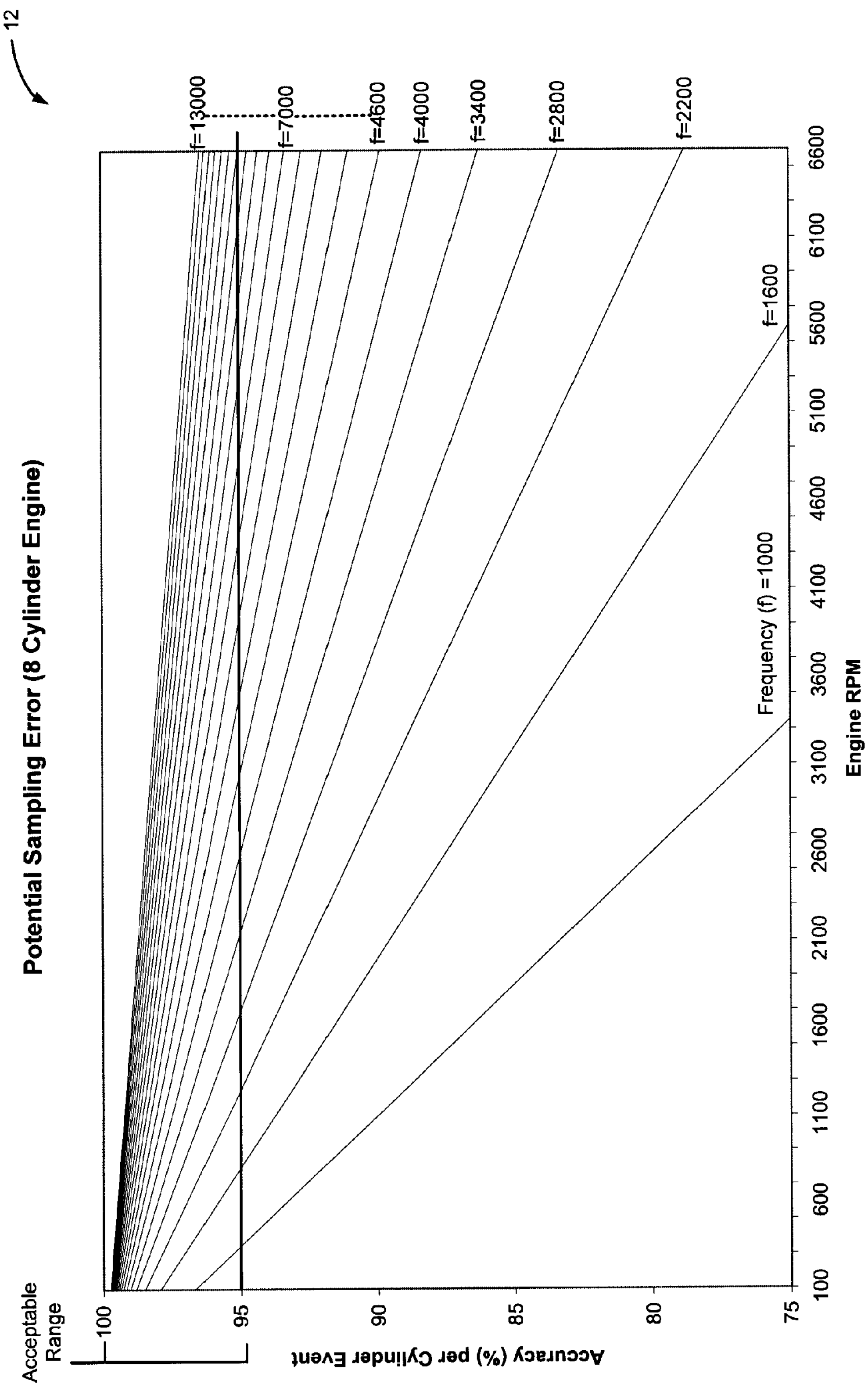
FIG. 2 is a graph illustrating the potential sampling error in a 8 cylinder engine for varying engine RPM values.
Figure 3:
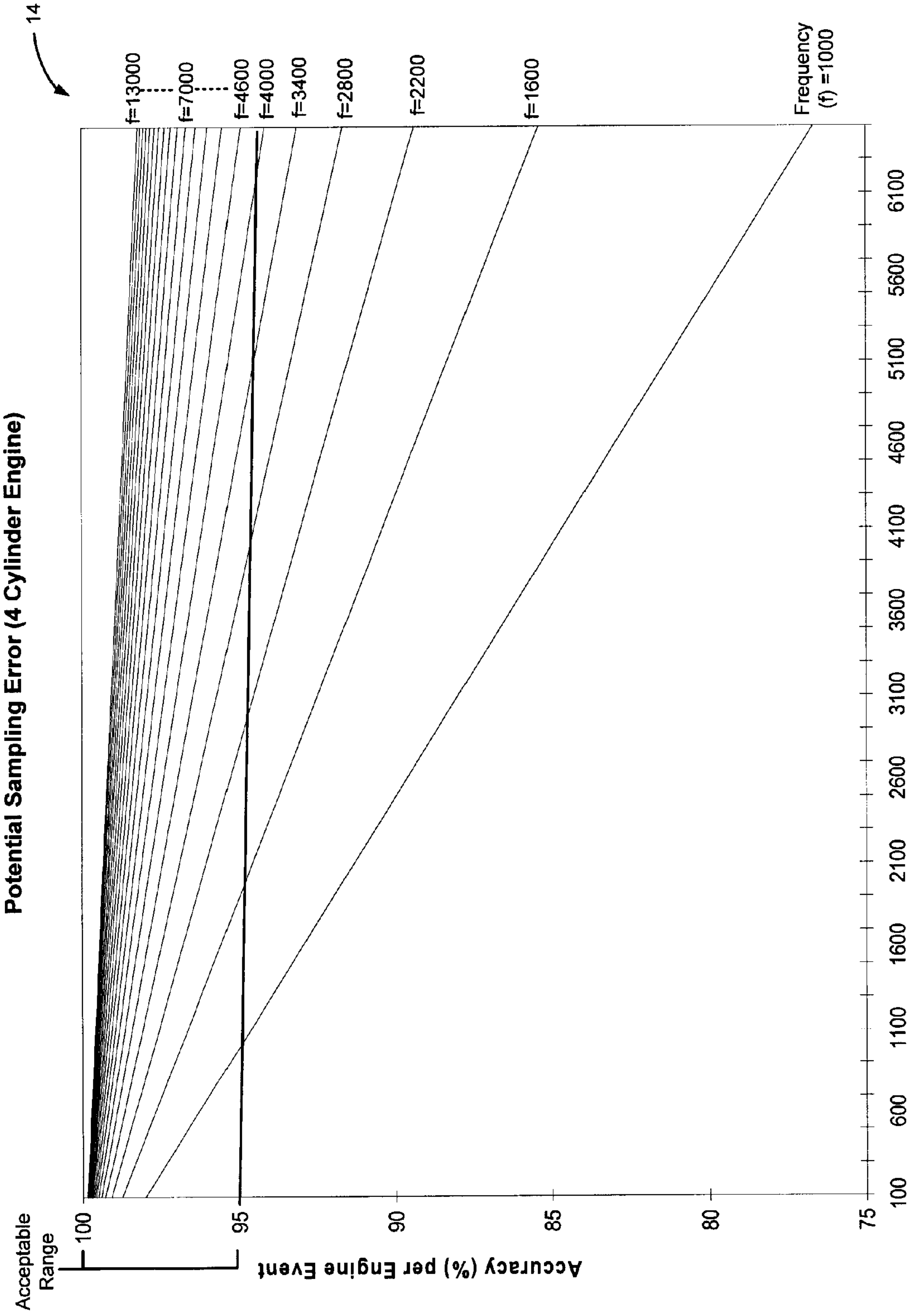
FIG. 3 is a graph illustrating the potential sampling error in a 4 cylinder engine for varying engine RPM values.

The following description is merely exemplary in nature and is in no way intended to limit the invention, its application, or uses. For purposes of clarity, the same reference numbers will be used in the drawings to identify the same elements. As used herein, the term module and/or device refers to an application specific integrated circuit (ASIC), an electronic circuit, a processor (shared, dedicated, or group) and memory that execute one or more software or firmware programs, a combinational logic circuit, or other suitable components that provide the described functionality.

Figure 4:
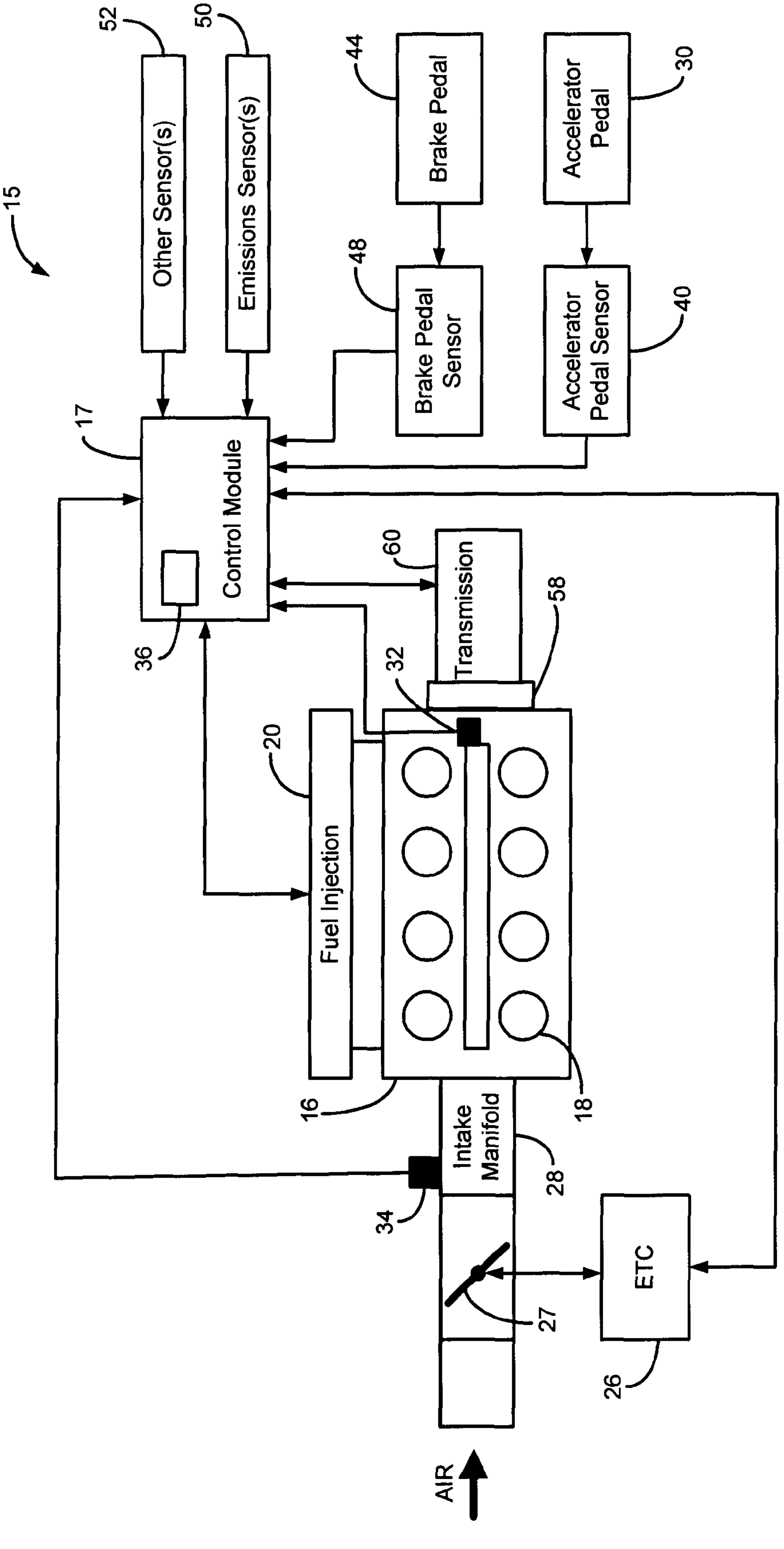
FIG. 4 is a functional block diagram of an engine system.

Referring now to FIG. 4, an engine system 15 utilizing the mass air flow system of the present application is shown. Engine system 15 may include engine 16 and control module 17. Engine 16 may include a plurality of cylinders 18 each with one or more intake valves and/or exhaust valves (not shown). During operation, defined cylinder (or LORES) events may be used for mass air flow calculations based on an engine position sensor ring (EPSR) 32 capable of determining the position of engine 16 components based on a position of a crankshaft (not shown).

Engine system 15 may further include fuel injection system 20 to provide fuel to cylinders of engine 16. Engine 16 may receive air that is combusted with fuel from fuel system 20 to drive pistons (not shown) of engine 16. Electronic throttle control (ETC) module 26 may adjust a throttle blade 27 in an intake manifold 28 based upon a position of an accelerator pedal 30 and a throttle control algorithm that is executed by ETC module 26. A position of accelerator pedal 30 may be sensed by accelerator pedal sensor 40, which may generate a pedal position signal that is output to ETC module 26 through communication with control module 17. A position of brake pedal 44 may be sensed by brake pedal sensor 48, which may generate a brake pedal position signal that is output to ETC module 26 through communication with control module 17.

It may be desired to determine a mass air flow or mass of air delivered to a cylinder 18 between cylinder events. In this manner, air supplied to cylinders 18 of engine 16 may be known or controlled, and these values may be used to provide proper fuel injection to achieve a desired air/fuel mixture for combustion. A mass air flow (MAF) sensor 34 may sense air passing to engine 16 through intake manifold 28. MAF sensor 34 may generate a voltage based on mass air flow which may be input to a voltage-controlled oscillator of MAF sensor 34. MAF sensor 34 may then output signal with a frequency that increases as the mass air flow input (represented by voltage) increases.

The relationship of frequency to mass air flow for MAF sensor 34 may be known and converted into a mass vs. period look-up table. The mass vs. period look-up table may be stored in memory of timing module 36. Timing module 36 may be a separate module or may be a component of control module 17. Timing module 36 may communicate mass and period values to control module 17 or components thereof. Control module 17 may use these values to determine a mass air flow between cylinder events. The mass air flow between cylinder events may be used to control engine 16 functions such as fuel injection from fuel injection system 20 to cylinders 18.

Cylinder events may be based on an output of EPSR 32. EPSR 32 may include a sensor capable of sensing a position of a crankshaft (not shown) of engine 16 such as by sensing a position of teeth on the crankshaft. From the crankshaft position it may be possible to determine the position of pistons within respective cylinders 18 of engine 16. For example, a typical LORES event associated with a cylinder event may be based on a piston position in a range such as 68°-78° before top dead center (bTDC) as measured by EPSR 32. The output of EPSR 32 may also be used to determine the elapsed time between cylinder events.

Control module 17 may also consider other inputs in controlling engine 16 functions such as fuel injection. Emissions sensors 50 and system sensors 52 may be received by control module 17. System sensors 52 may be sensors such as a temperature sensor or a barometric pressure sensor, and other conventional sensor and/or controller signals. An output of engine 16 may be coupled by torque converter 58 and transmission 60 to front and/or rear wheels.

Figure 5:
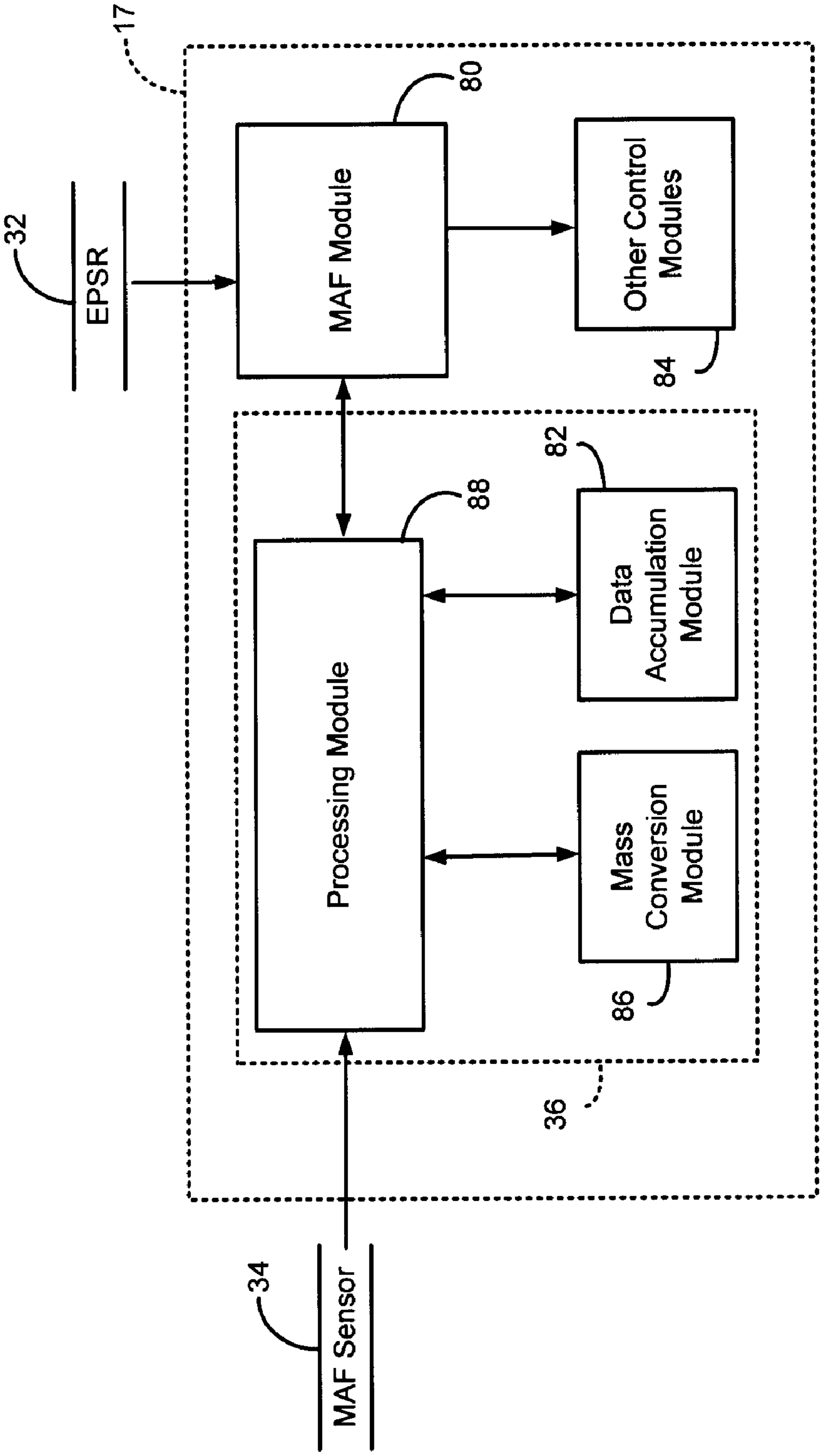
FIG. 5 is a functional block diagram of a control module of the engine system.

Referring now to FIG. 5, control module 17 and timing module 36 are shown in more detail. For purposes of FIG. 5, timing module 36 may be depicted as a component of control module 17. Control module 17 may provide the functionality of determining mass air flow and may include timing module 36, mass air flow (MAF) module 80, and other control modules 84. Timing module 36 may include data accumulation module 82, mass conversion module 86, and processing module 88.

Timing module 36 may provide the first level of mass air flow calculations, freeing up processing time within other processors of control module 17. Processing module 88 of timing module 36 may receive a signal from MAF sensor 34 and measure the period of the signal for each cycle of the signal. Mass conversion module 86 may convert period data from processing module 88 to mass data. For example, mass conversion module 86 may be a look-up table and may include mass vs. period data for the MAF sensor 34. Processing module 88 may be in communication with mass conversion module 86 to receive a mass value for the measured period. Processing module 88 may then communicate with data accumulation module 82 to accumulate the latest mass and period values with running accumulations of total measured mass and period. Processing module 88 may communicate the accumulated values from data accumulation module 82 to MAF module 80 based on a request from MAF module 80.

MAF module 80 may communicate with processing module 88 to receive accumulated mass and period data at desired times based on cylinder events as indicated by EPSR 32. MAF module 80 may determine when a cylinder event occurs based on an output of EPSR 32. At each cylinder event, MAF module 80 may query processing module 88 to receive the accumulated mass and period data for that cylinder event. MAF module 80 may then determine an overall mass or mass air flow between the engine events based on the accumulated mass and period data and an elapsed time between the cylinder events.

MAF module 80 may communicate mass and mass air flow values to other control modules 84. Other control modules 84 may include control modules that utilize mass air flow information to determine combustion parameters such as fuel injection. For example, another control module 84 may modify the amount of fuel injected into cylinders 18 of engine 16 based on mass air flow to maintain a desired air/fuel mixture for combustion.

Figure 6:
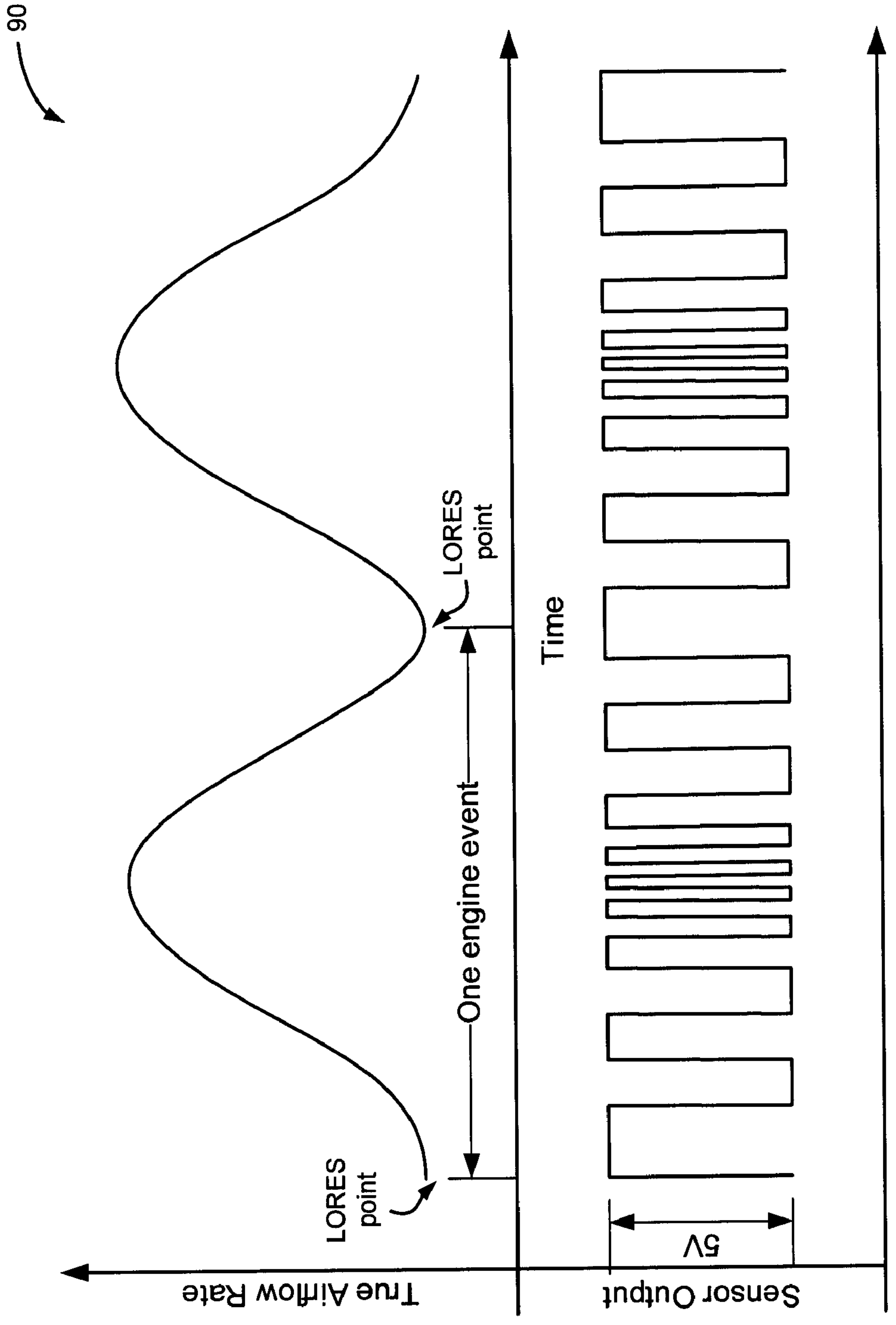
FIG. 6 is a graph illustrating an exemplary output of a MAF sensor as a function of frequency.

Referring now to FIG. 6, a graph illustrating an exemplary frequency output of MAF sensor 34 for an exemplary mass air flow pattern is shown and is generally identified at 90. The MAF sensor output is depicted as the bottom signal and may be a square wave. As can be seen in FIG. 6, each cylinder event corresponds to a LORES value. As the mass air flow passing the MAF sensor increases, the frequency of the MAF sensor output signal also increases. The period associated with a complete cycle of MAF sensor 34 decreases as mass air flow increases.

Figure 7:
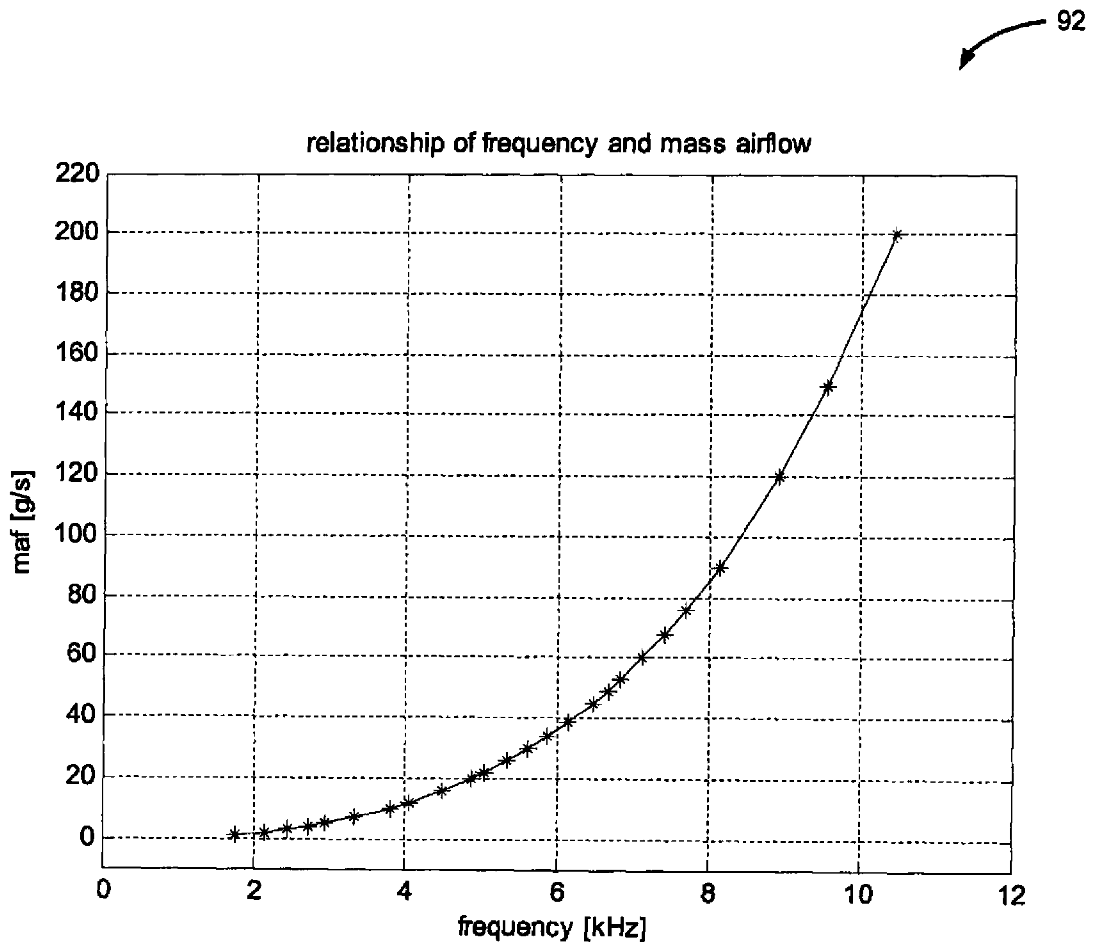
FIG. 7 is a graph of mass air flow as a function of frequency for an exemplary mass air flow sensor.

Referring now to FIG. 7, graph 92 depicts a relationship between frequency and mass air flow for an exemplary MAF sensor 34. Frequency may be on the x-axis and may be in units of kilohertz (kHz). Mass air flow may be on the y-axis and may be in units of grams per second (g/s). As can be seen from FIG. 7, the frequency output of MAF sensor 34 may increase with mass air flow in a nonlinear fashion. This is the manner in which most MAF sensor 34 manufacturers provide information regarding the MAF sensor 34.

Figure 8:
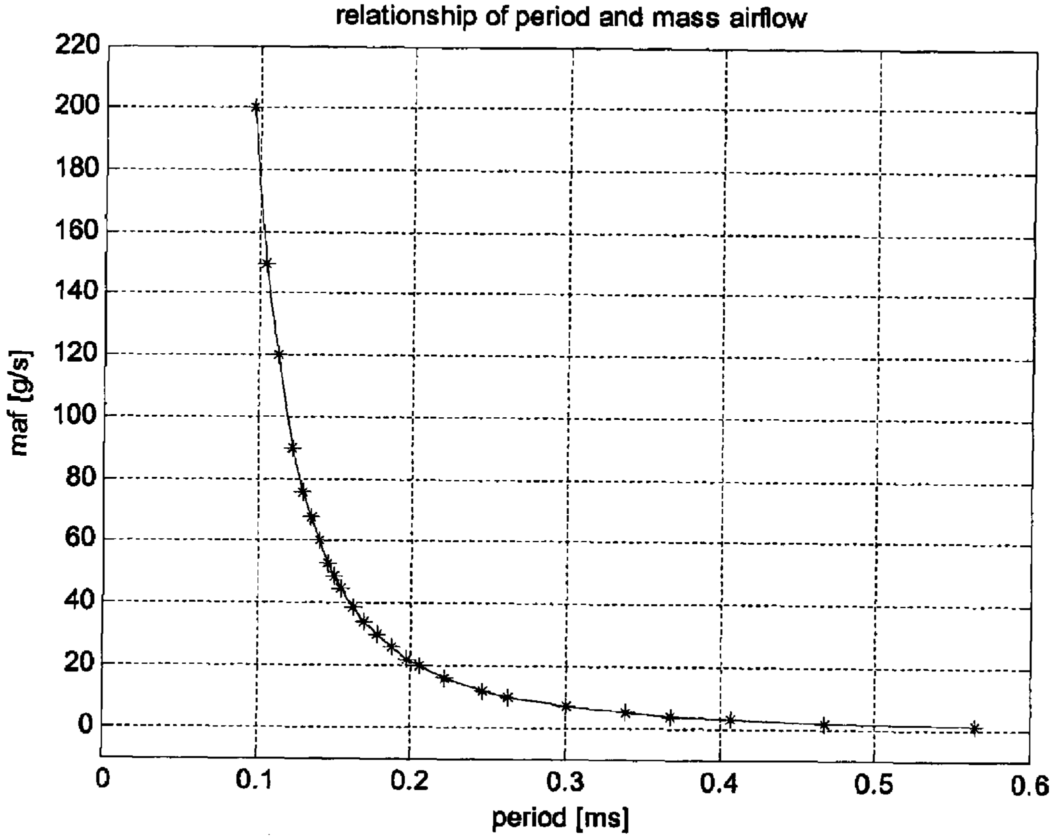
FIG. 8 is a graph of mass air flow as a function of period for an exemplary mass air flow sensor.

Referring now to FIG. 8, graph 94 depicts a relationship between period and mass air flow for an exemplary MAF sensor 34. Graph 94 may be determined from graph 92 based on the relationship between frequency (cycles per second) and period (seconds per cycle). Period may be on the x-axis and may be in units of milliseconds (ms). Mass air flow may be on the y-axis and may be in units of g/s. The shorter the period of the cycle being considered, the higher the mass air flow for that cycle. Graph 94 may be useful for determining mass air flow because a signal received from MAF sensor 34 may have a period that is easily measured by determining the time between consecutive rising or falling edges of the signal.

Figure 9:
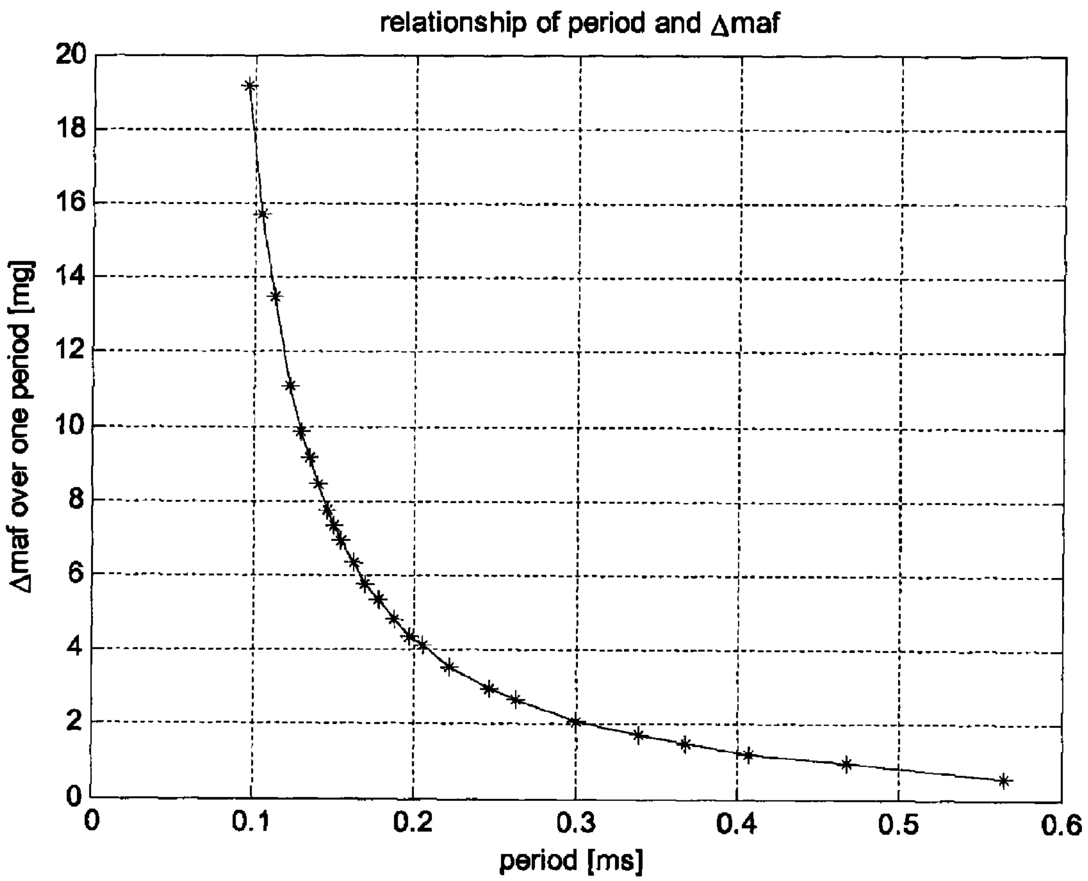
FIG. 9 is a graph of mass as a function of period for an exemplary mass air flow sensor.

Referring now to FIG. 9, graph 96 depicts a relationship between mass and period for an exemplary MAF sensor 34. Graph 96 may be determined from graph 94 by multiplying a mass air flow value for a period in grams per second by the value of that period in milliseconds to determine a mass for the particular period. Period may be on the x-axis and may be in units of milliseconds. Mass may be on the y-axis and may be in units of milligrams (mg). Period data may be measured by processing module 88 of timing module 36 based on rising or falling edges of a signal from MAF sensor 34. The shorter the period measured by processing module 88 of timing module 36, the greater the mass for that cycle. The information of graph 96 may be used to create the look-up table of mass conversion module 86. Mass vs. period information may be useful in determining an overall mass air flow between cylinder events because the units (mass and time) can be accumulated between cylinder events to determine an overall mass air flow (mass per unit time).

Figure 10:
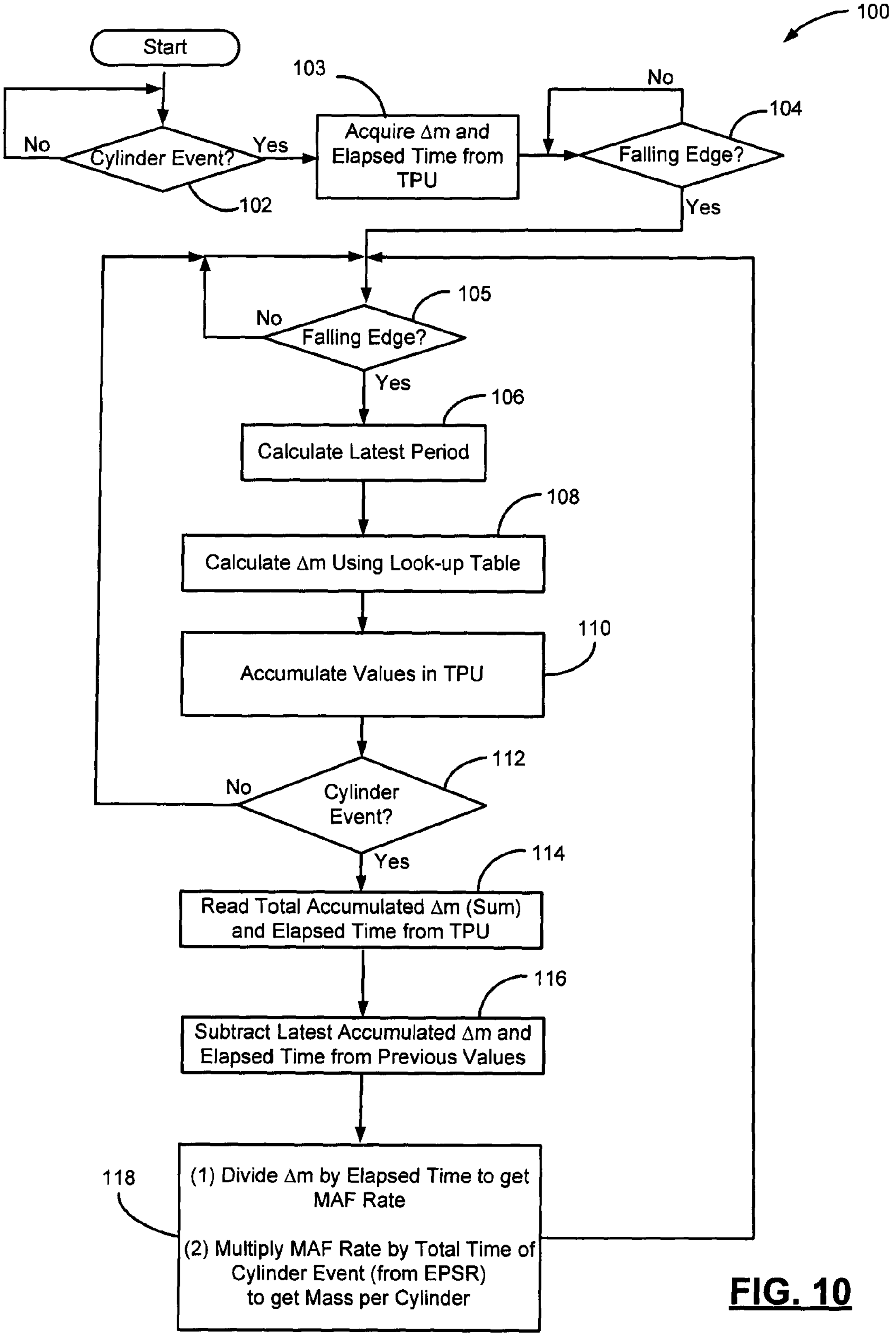
FIG. 10 is a flowchart illustrating the operation of a control system for determining mass air flow.

Referring now to FIG. 10, a flowchart illustrating steps for calculation of mass and mass air flow between cylinder events is depicted in control logic 100. Control logic 100 may begin at step 102. At step 102, MAF module 80 may monitor an output of EPSR 32 for a new cylinder event. When a new cylinder event has occurred, MAF module 80 may store the time of the cylinder event and control logic 100 may continue to block 103. If not, control logic 100 may continue looping about block 102 until a first cylinder event is encountered. At block 103, MAF module processing module 80 may query processing module 88 of timing module 36 to get baseline accumulated mass and time data. Alternatively, MAF module 80 could communicate with processing module 88 to zero out any accumulated mass and time data. Control logic 100 may then continue to block 104 to wait for a falling edge from MAF sensor 34.

At block 104, processing module 88 may wait for a falling edge from MAF sensor 34. Alternatively, processing module 88 could wait for a rising edge from MAF sensor 34. Assuming a falling edge is used, control logic 100 could continue looping about block 104 until a falling edge is received. Once a falling edge is received processing module 88 may begin counting the time until the next falling edge and continue to block 105. At block 105, processing module 88 may wait for the next falling edge from MAF sensor 34. When the next falling edge arrives at block 105, control logic 100 may continue to block 106. Until the falling edge arrives, control logic 100 may continue looping about step 105.

At step 106, processing module 88 may determine the elapsed time between the previous falling edge and the latest falling edge of the output of MAF sensor 34 (i.e., one cycle) to determine a period for that cycle. Control logic 100 may then proceed to step 108. At step 108, processing module 88 may determine the mass of air (mg) corresponding to the period of the most recent cycle using mass conversion module 86 of timing module 36. Mass conversion module 86 may contain a table used to convert the period data to mass data as in graph 96. Control logic 100 may proceed to step 110.

At step 110, processing module 88 may store the latest mass and period values in data accumulation module 82 of timing module 36. Data accumulation module 82 may include a running accumulation of total air mass and time. This running accumulation may be performed by adding the latest mass and time values to previously accumulated values. Control logic 100 may continue to block 112. At block 112 MAF module 80 may monitor EPSR 32 to determine whether another cylinder event has occurred. Steps 105 through 112 may continue to wait for falling edges, calculate a period between falling edges, determine a mass for the period, and accumulate mass and period data until another cylinder event occurs. Once another cylinder event occurs, MAF module 80 may store the time of the cylinder event and control logic 100 may continue to step 114.

At step 114, MAF module 80 may query processing module 88 of timing module 36 to get the latest accumulated mass and time values from data accumulation module 82. Control logic 100 may then proceed to step 116. At step 116, MAF module 80 may access the previous accumulated mass and time values associated with the previous cylinder event. MAF module 80 may then subtract the latest accumulated mass and time from the previous accumulated mass and time to determine the mass and time between the two latest cylinder events. Control logic 100 may then proceed to step 118.

At step 118, MAF module 80 may divide the mass between the two cylinder events by the time between the two cylinder events to determine an average mass air flow between the two cylinder events. If a total mass value is desired, MAF module 80 may multiply this average mass air flow by the total elapsed time between the two cylinder events as determined from the EPSR 32 signals. MAF module 80 may communicate these values to other control modules 84 for use in vehicle operations such as fuel injection. Control may then return to step 105 to resume measuring mass and period until the next cylinder event occurs.

Those skilled in the art can now appreciate from the foregoing description that the broad teachings of the present invention can be implemented in a variety of forms. Therefore, while this invention has been described in connection with particular examples thereof, the true scope of the invention should not be so limited since other modifications will become apparent to the skilled practitioner upon a study of the drawings, the specification and the following claims.

What is claimed is:

1. A method comprising:

receiving a mass air flow signal having a frequency that varies based on mass air flow in an intake manifold of an engine;

determining first period data from the mass air flow signal;

deriving first mass data for the mass air flow signal based on the first period data;

storing the first period data and the first mass data for N cylinder events, wherein N is an integer greater than 1; and calculating a mass air flow between the N cylinder events based on the stored first period data and the stored first mass data.

2. The method of claim 1 wherein determining the first period data includes determining the first period data between consecutive transitions of the mass air flow signal to a negative slope.

3. The method of claim 1 further comprising adjusting an engine operating parameter based on the calculated mass air flow.

4. The method of claim 1 wherein the mass air flow signal is a square-wave signal.

5. The method of claim 4 wherein determining the first period data is performed between falling edge transitions of the mass air flow signal.

6. The method of claim 1 wherein deriving the first mass data includes indexing a table having the first mass data based on the first period data.

7. The method of claim 6 wherein the calculating the mass air flow includes dividing the stored first mass data by the stored first period data.

8. The method of claim 1 further comprising:

determining a second period between the N cylinder events; and calculating a second mass between the N cylinder events based on a product of the calculated mass air flow and the second period.

9. The method of claim 8 wherein the determining the second period between the N cylinder events is based on an engine position sensor ring (EPSR) signal.

10. The method of claim 9 wherein the EPSR signal indicates a piston located at a range of 68°-78° before top dead center.

11. A control system for an engine, comprising:

a timing module that receives a mass air flow signal having a frequency that varies based on a mass air flow in an intake manifold of the engine, that determines first period data from the mass air flow signal, that derives first mass data based on the first period data, and that stores the first mass data and the first period data; and a mass air flow module that calculates a mass air flow for N cylinder events from the stored first mass data and the stored first period data, wherein N is an integer greater than 1.

12. The control system of claim 11 wherein a first period of the first period data is selected between consecutive transitions of the mass air flow signal to a negative slope.

13. The control system of claim 11 wherein the mass air flow module divides the stored first mass data by the stored first period data to calculate a mass air flow.

14. The control system of claim 11 wherein the mass air flow signal is a square-wave signal.

15. The control system of claim 14 wherein the first period of the first period data is selected between falling edge transitions of the mass air flow signal.

16. The control system of claim 11 wherein the timing module includes:

a mass conversion module that derives the first mass data based on the first period data; and a data accumulation module that cumulates the first mass data and the first period data.

17. The control system of claim 16 wherein the mass conversion module includes a look-up table having first mass data indexed by first period data.

18. The control system of claim 11 wherein the mass air flow module determines a second period between the N cylinder events and derives a second mass between the N cylinder events based on a product of the calculated mass air flow and the second period.

19. The control system of claim 18 wherein the mass air flow module determines the second period based on an engine sensor position ring (EPSR) signal.

20. The control system of claim 19 wherein the EPSR signal indicates a piston located at a range of 68°-78° before top dead center.

* * * * *